US010936874B1

(12) United States Patent
Yildiz et al.

(10) Patent No.: US 10,936,874 B1
(45) Date of Patent: Mar. 2, 2021

(54) CONTROLLER GESTURES IN VIRTUAL, AUGMENTED, AND MIXED REALITY (XR) APPLICATIONS

(71) Applicant: Dell Products, L.P., Round Rock, TX (US)

(72) Inventors: Yagiz Can Yildiz, Austin, TX (US); Michael S. Gatson, Austin, TX (US); Ryan Nicholas Comer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 31 days.

(21) Appl. No.: 16/538,945

(22) Filed: Aug. 13, 2019

(51) Int. Cl.
| | | |
|---|---|---|
| *G06K 9/00* | (2006.01) | |
| *G06F 3/01* | (2006.01) | |
| *G06T 19/00* | (2011.01) | |
| *A63F 13/493* | (2014.01) | |
| *G02B 27/01* | (2006.01) | |

(52) U.S. Cl.
CPC ........ *G06K 9/00671* (2013.01); *A63F 13/493* (2014.09); *G02B 27/0103* (2013.01); *G06F 3/017* (2013.01); *G06T 19/006* (2013.01); *A63F 2300/636* (2013.01)

(58) Field of Classification Search
None
See application file for complete search history.

(56) References Cited

U.S. PATENT DOCUMENTS

| | | | |
|---|---|---|---|
| 2016/0259404 A1* | 9/2016 | Woods | .................... G01S 19/42 |
| 2016/0334940 A1* | 11/2016 | Kandadai | .............. G06F 3/0488 |
| 2019/0033960 A1* | 1/2019 | Ho | .......................... A63F 13/52 |
| 2019/0060742 A1* | 2/2019 | Moon | ................... G06T 19/006 |
| 2019/0094966 A1* | 3/2019 | Kulkarni | ................ G06N 20/00 |

OTHER PUBLICATIONS

Oculus; "The Wizards | VR Playthrough | Oculus Rift Stream with Kate Elliott;" YouTube video; May 10, 2018; https://www.youtube.com/watch?v=kWL7N2zJa3o; p. 1-4 (Year: 2018).*

(Continued)

*Primary Examiner* — Peter Hoang
(74) *Attorney, Agent, or Firm* — Fogarty LLP

(57) ABSTRACT

Embodiments of systems and methods for providing controller gestures in virtual, augmented, or mixed reality (xR) applications are described. In some embodiments, an Information Handling System (IHS) may include a processor and a memory coupled to the processor, the memory having program instructions stored thereon that, upon execution, cause the IHS to: receive one or more first Simultaneous Localization and Mapping (SLAM) landmarks corresponding to a first controller; receive one or more second SLAM landmarks corresponding to a second controller; determine, using the first and second SLAM landmarks, that the first controller is within a threshold distance of the second controller; in response to the determination, receive first Inertial Measurement Unit (IMU) data from the first controller and second IMU data from the second controller; identify, using the first and second IMU data, a gesture performed with the first and second controllers; and execute a command associated with the gesture.

16 Claims, 10 Drawing Sheets

(56) References Cited

OTHER PUBLICATIONS

Cas and Chary VR; "Oculus Quest Multiplayer Gameplay in the SAme Room!! How to Level Up in OrbusVR: Reborn (Part 2)"; YouTube video; Jun. 6, 2019; https://www.youtube.com/watch?v=_4-PgZMWQs8; p. 1-2 (Year: 2019).*

Thomas Schlomer, et al., "Gesture Recognition with a Wii Controller," 4 pages, retrieved May 23, 2019, available at http://citeseerx.ist.psu.edu/viewdoc/download?doi=10.1.1.725.5526&rep=rep1&type=pdf.

Annie Dossey, "NFC: The Technology Behind Tap-and-Go Communication," Clearbridge Mobile Newsletter, Nov. 9, 2017, 13 pages, retrieved May 23, 2019, available at https://clearbridgemobile.com/how-secure-are-nfc-mobile-payments/.

Elven Assassin, VR games using two or more controllers' locations, relative to each other or together as an input, 9 pages, publisher vrgamecritic, retrieved May 23, 2019, available at https://vrgamecritic.com/game/elven-assassin.

Michael Archambault, "Tap Strap wearable keyboard gains support for VR applications," 7 pages, Sep. 20, 2018, retrieved May 23, 2019, available at https://www.digitaltrends.com/computing/tap-wearable-keyboard-vr-support/.

Ben Lang, "Analysis of Valve's 'Lighthouse' Tracking System Reveals Accuracy—Road to VR," 4 pages, Jul. 17, 2016, publisher Road Tovr, available at https://www.roadtovr.com/analysis-of-valves-lighthouse-tracking-system-reveals-accuracy/.

* cited by examiner

CONTROLLER GESTURES IN VIRTUAL, AUGMENTED, AND MIXED REALITY (XR) APPLICATIONS

FIELD

The present disclosure generally relates to Information Handling Systems (IHSs), and, more particularly, to systems and methods for providing controller gestures in virtual, augmented, or mixed reality (xR) applications.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for providing controller gestures in virtual, augmented, or mixed reality (xR) applications are described. In an illustrative, non-limiting embodiment, an Information Handling System (IHS) may include a processor and a memory coupled to the processor, the memory having program instructions stored thereon that, upon execution, cause the IHS to: receive one or more first Simultaneous Localization and Mapping (SLAM) landmarks corresponding to a first controller; receive one or more second SLAM landmarks corresponding to a second controller; determine, using the first and second SLAM landmarks, that the first controller is within a threshold distance of the second controller; in response to the determination, receive first Inertial Measurement Unit (IMU) data from the first controller and second IMU data from the second controller; identify, using the first and second IMU data, a gesture performed with the first and second controllers; and execute a command associated with the gesture.

In some implementations, the first and second SLAM landmarks may be received from a Head-Mounted Device (HMD) worn by a user. In other implementations, the first SLAM landmarks may be received from a first Head-Mounted Device (HMD) worn by a first user and the second SLAM landmarks may be received from a second HMD worn by a second user. The first and second IMU data may include accelerometer data indicative of an impulse or collision, and the gesture may include a tapping gesture. Moreover, the tapping gesture may be detected in the absence of a physical collision between the first and second controllers.

In some cases, the program instructions, upon execution, may cause the IHS to identify the tapping gesture as a vertical tap or a horizontal tap. In response to the gesture being detected in a left side of a SLAM frame, the command may be a first command, wherein in response to the gesture being detected in a center area of the SLAM frame, the command may be a second command, or in response to the gesture being detected in a right side of a SLAM frame, the command may be a third command.

For example, the command may include switching tools between the first and second controllers in a game. Additionally, or alternatively, command may include switching tools or characters in a game between a first user operating the first controller and a second user operating the second controller. Additionally, or alternatively, the command may include a pause command or a resume command directed to a game or application executed by the IHS.

The program instructions, upon execution, may further cause the IHS to determine whether the peripheral belongs to the user's left hand or right hand. To determine whether the peripheral device belongs to the user's left hand or right hand, the program instructions, upon execution, may cause the IHS to: split a Field-of-View (FOV) into a left side and a right side; and at least one of: in response to the one or more landmarks being located on the left side, assign the peripheral device to the user's left hand; or in response to the one or more landmarks being located on the right side, assign the peripheral device to the user's right hand.

Furthermore, the program instructions, upon execution, may cause the IHS to determine whether the second controller belongs to a first user or to a second user based upon an evaluation of the Kalman Gain of the other one or more SLAM landmarks.

In another illustrative, non-limiting embodiment, a hardware memory device may have program instructions stored thereon that, upon execution by a processor of an IHS, cause the IHS to: receive one or more first SLAM landmarks corresponding to a first controller; receive one or more second SLAM landmarks corresponding to a second controller; determine, using the first and second SLAM landmarks, that the first controller is within a threshold distance of the second controller; in response to the determination, receive first IMU data from the first controller and second IMU data from the second controller; identify, using the first and second IMU data, a gesture performed with the first and second controllers; and execute a command associated with the gesture.

In various implementations, the first SLAM landmarks may be received from a first HMD worn by a first user, and the second SLAM landmarks may be received from a second HMD worn by a second user. The first IMU data may also include accelerometer data produced by a third HMD worn by a third user, and the first and third HMDs may be in communication with each other.

In yet another illustrative, non-limiting embodiment, a method may include receiving, at an IHS, first SLAM landmarks corresponding to a first controller; receiving, at the IHS, second SLAM landmarks corresponding to a second controller; identifying, by the IHS using: (i) the first SLAM landmarks, (ii) the second SLAM landmarks, (iii) the first IMU data, and (iv) the second IMU data, a gesture performed with the first and second controllers; and executing, by the IHS, a command associated with the gesture.

The first SLAM landmarks may be received from a first HMD worn by a first user and the second SLAM landmarks may be received from a second HMD worn by a second user. The first and second SLAM landmarks may include location data indicative of a position of the first and second controllers, respectively, and the first and second IMU data comprise accelerometer data indicative of a simulated tap between the first and second controllers.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
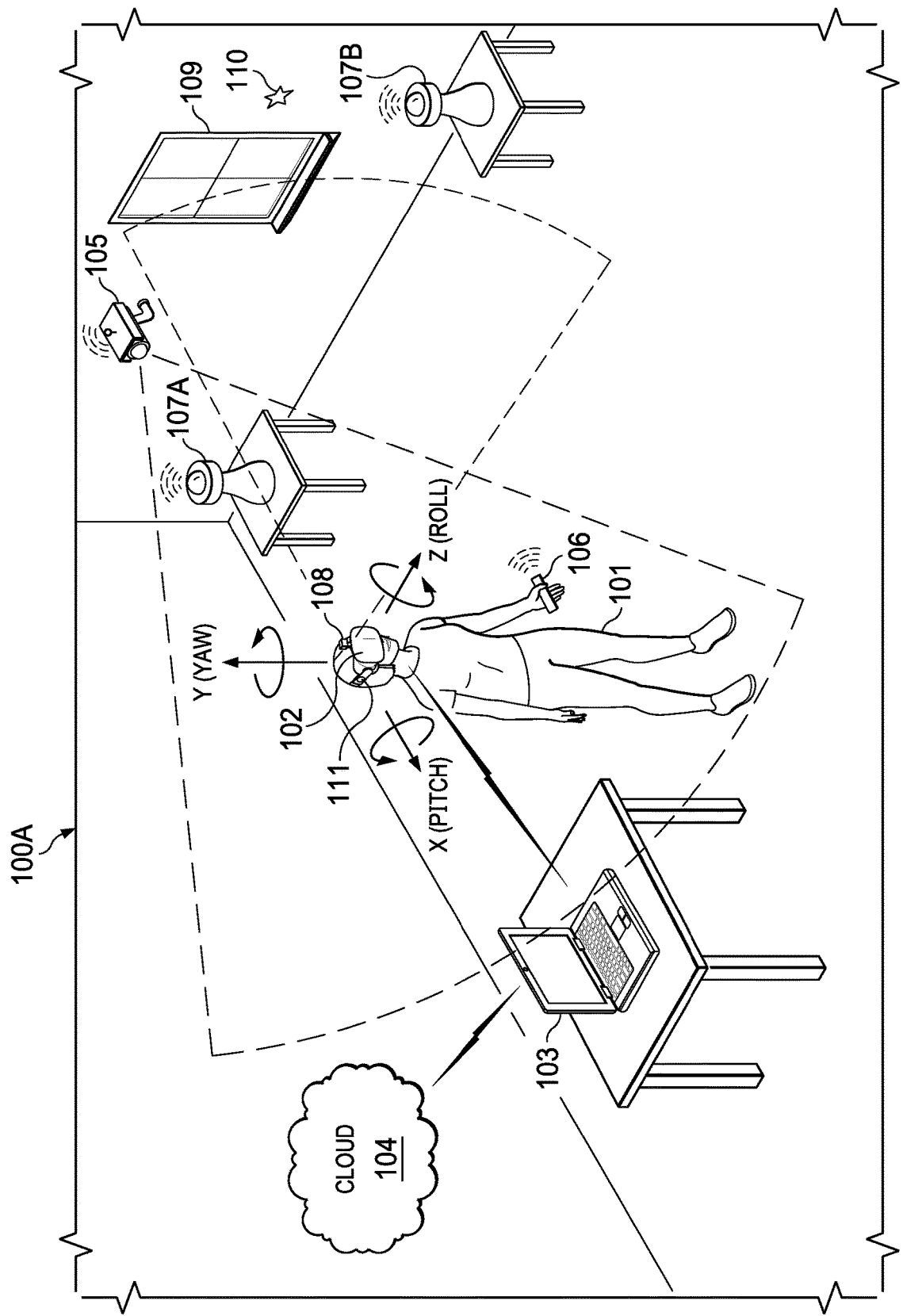
FIGS. 1A-C illustrate an example of an environment where a virtual, augmented, or mixed reality (xR) application may be executed, according to some embodiments.

Embodiments described herein may be implemented, for example, in virtual, augmented, or mixed reality (xR) applications that employ Head-Mounted Devices (HMDs), Heads-Up Displays (HUDs), headsets, and eyeglasses—collectively referred to as "HMDs." More broadly, however, embodiments described herein may also be implemented in non-HMD environments, such as in gaming consoles, conferencing rooms, televisions, projectors, desktop, and/or laptop computers—equipped with tracking subsystems.

In various implementations, xR HMDs may be paired with controllers (or other peripheral devices) and it is common for a controller to have infrared (IR) emitter(s) or marker reflector(s). These controllers typically have buttons and/or joysticks for providing input via Bluetooth or other communication channel to a host system (e.g., an Information Handling System or "IHS"), and are usually tracked by external lighthouse and/or HMD tracking cameras. In many instances, a controller may be equipped with an Inertial Measurement Unit (IMU) to measure the direction and change of position of the controller in the user's space.

For gaming and commercial applications, such as education and training, xR systems can make use of either a single controller or two (e.g., one controller in each of a user's hand). In use, these controllers may be assigned a task or represent a specific operation or artifact (e.g., in a game, a controller may represent a sword, a hammer, etc.), and each controller may operate independently as part of an xR application. In some cases, such as when mimicking a bow and arrow, for example, artifacts represented by the individual controllers are used together within the application to represent a two-controller operation, such as the simulated shooting of a bow (e.g., represented by a first controller on the user's left hand) and arrow (e.g., represented by a second controller on the user's right hand).

In many situations, controllers may not have a specific function or set of functions outside of an xR application or environment: the user must enter the immersive xR environment (e.g., by donning a headset), and then he or she generally requires some assistance to use the controllers. Multiple buttons to input on each controller can also be confusing for the user. To address these, and other concerns, the inventors hereof have developed systems and methods for defining a set of "gestures" or motions to interact with the system. A more robust set of gestures may be provided with the use case of two controllers operating in tandem and by detecting the motion in closest proximity representing physical contact (e.g., tapping) of the controllers to each other.

In some embodiments, a service may detect that two controllers are within a predefined physical contact distance of each other. In response, the service listens to the IMU streams from the two controllers to detect movement data that indicates tapping. Each different tap is then translated into a pre-defined or user-defined controller gesture, for instance, based upon the orientation of each controller and the area of the frame where the tapping happens. Different types of controller-gestures may be used for many different kinds of user inputs, such as, for example, a switching operation or tools used in a game between left and right controller in a game or application, a pausing operation (timeout) in the game or application, a resuming operation in the game or application, etc.

In other embodiments, systems and methods described herein may be employed in co-located multi-user use cases where controllers for each user in a session are enumerated and tracked by each HMD tracking subsystem. Tapping between two or more different users' controllers may be detected based on their respective IMU data, once identified within tapping distance.

FIG. 1A is a perspective view of environment 100A where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In various applications, two or more users may be in the same environment or room 100A such that their respective HMDs may be said to be co-located. For example, co-located HMDs may be within a predefined physical distance from each other (e.g., up to 10 meters), and each HMD worn by each user may be coupled to a distinct IHS. In some cases, the IHS serving a particular HMD may be part of an edge cloud architecture.

In environment 100A, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100A, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Today, most HMD 102's processing is limited and restricted to some amount of pre-processing, with Simultaneous Localization and Mapping (SLAM) camera frames being sent to IHS 103 for further processing. Data transmitted from HMD 102 to IHS 103 is said to be transmitted over "back-channel" 409 (FIG. 4) whereas data transmitted from IHS 103 to HMD 102 is said to be transmitted over "forward-channel" 410.

Figure 1B:
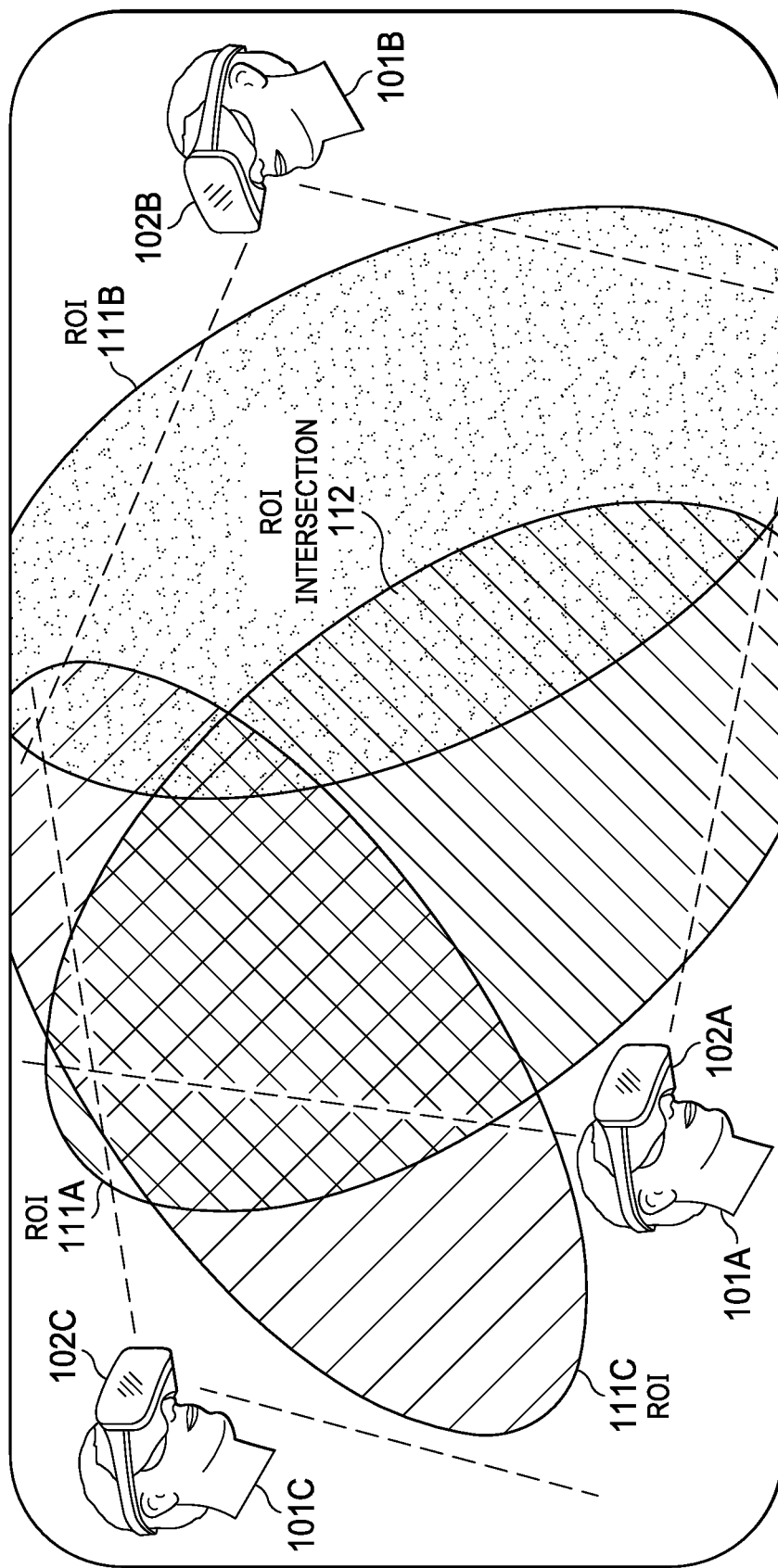

FIG. 1B shows a co-located multi-user xR implementation with three participants 101A-C, each participant wearing their own HMDs 102A-C. In some cases, each of HMDs 102A-C may be tethered to its own dedicated IHS 103A-C. Alternatively, a first number M of HMDs and a second number N of IHSs may be used (e.g., one IHS "server" for two HMD "clients," etc.). In this example, it is assumed that each of the IHSs may have different compute capabilities; and that all HMDs are using inside-out Extended Kalman Filtering (EKF) Simultaneous Localization and Mapping (SLAM) tracking, with wide mapping field of view up to 360 degrees (e.g., with surround sensors and/or cameras).

In distributed SLAM, co-located client nodes perform SLAM collaboratively to create a map (a "SLAM map") of their shared physical space. For example, multiple HMDs may be co-located in a given space, and their supporting IHSs may be either co-located or part of an edge cloud architecture. In various implementations, distributed SLAM requires that client nodes exchange information with other client nodes via communication channels that are lossy and/or band-limited.

As such, each HMD 102A-C may include an instance of inside-out camera 108 configured to capture IR/NIR frames, and therefore sends those frames and associated data (SLAM data) to its respective IHS 103A-C. Then, each IHS 103A-C determines one or more Regions-of-Interest (ROIs) 111A-C within the HMD 102A-C's respectively captured frames and/or field-of-view (FOV), and performs one or more SLAM operations upon the SLAM data obtained for each ROI. In some cases, an ROI may be equal to an FOV plus a delta 3D range for anticipatory movements.

Depending upon the position and pose of each HMD, ROI intersection area 112 may occur, for example, such that redundant or duplicate calculations are performed by HMDs 102A-C for landmarks found in that intersection.

Figure 1C:
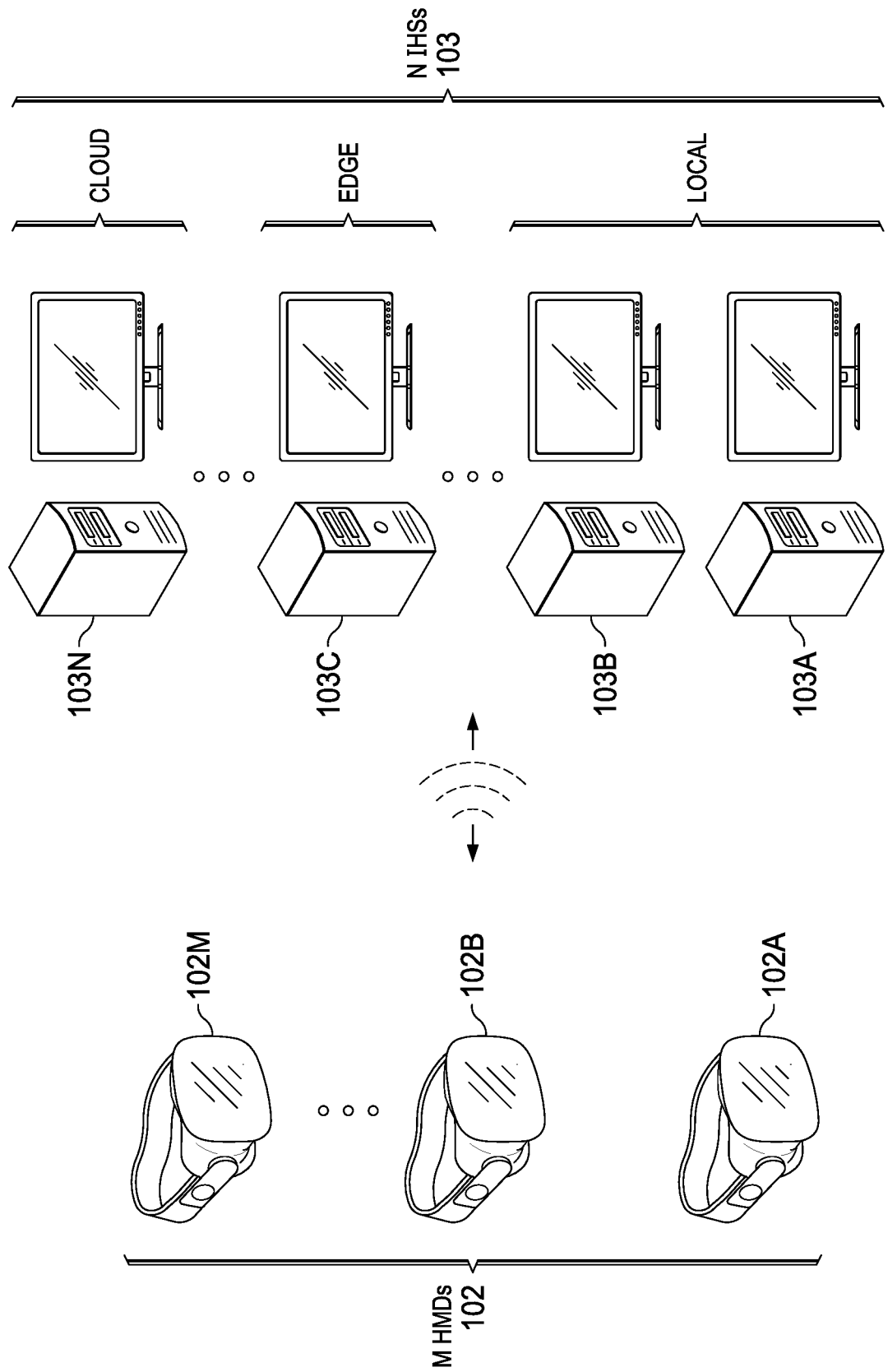

FIG. 1C shows HMD client nodes 102A-M connected wired/wirelessly in a mesh ad-hoc network architecture to IHS server nodes 103A-N. In some architectures, one of IHS nodes 103A-N (e.g., the first node to start the xR collaboration session) may be responsible for session control actions, but otherwise the network may remain without a central server. Additionally, or alternatively, remote edge server 103C and/or remote cloud server 103N may enable co-located IHSs 103A and 103B (with respect to HMDs 102A-M) to offload xR processing and/or additional operations to it, as part of an edge cloud architecture, or the like.

Figure 2:
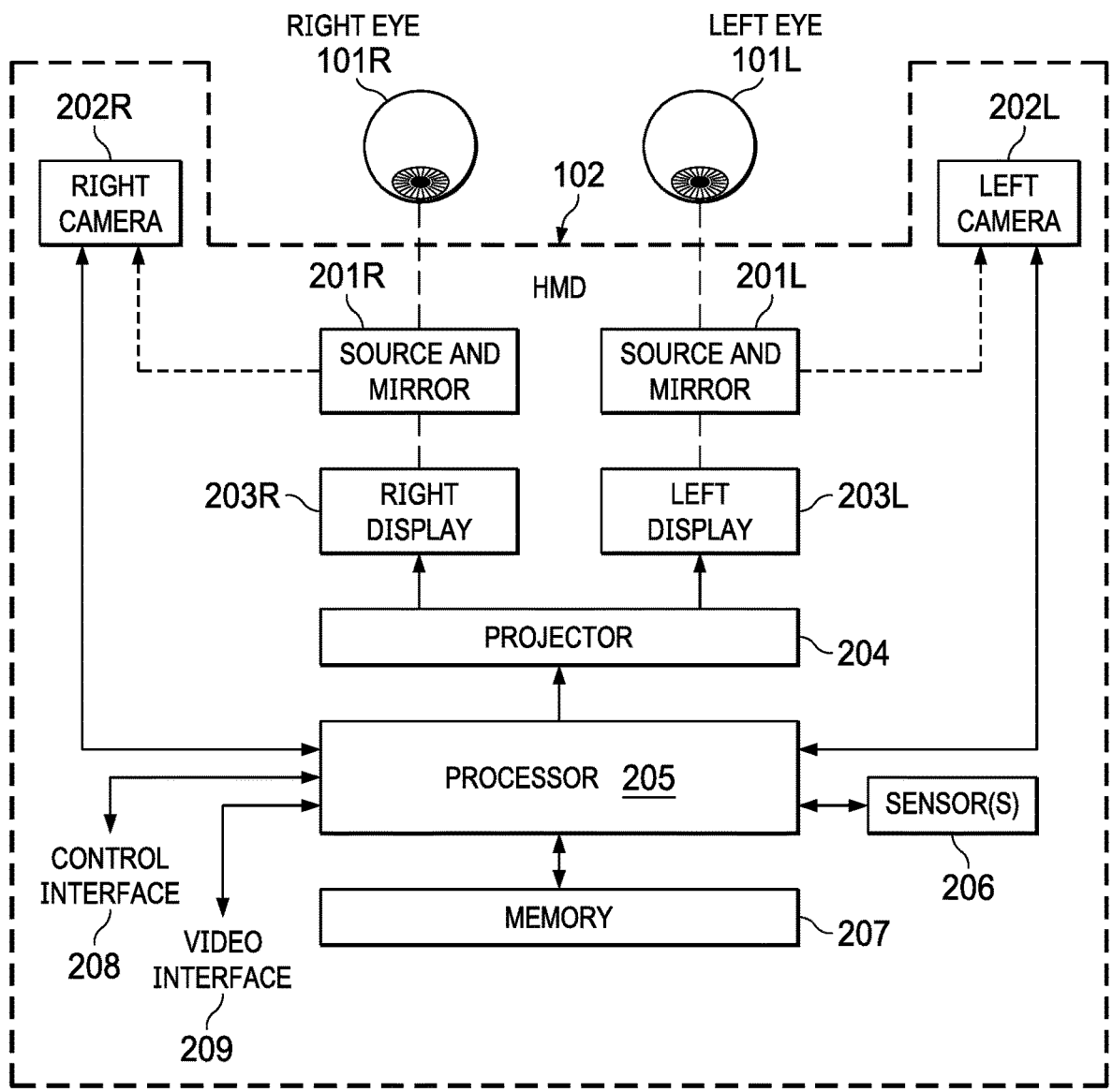
FIG. 2 illustrates an example of electronic components of a Head-Mounted Display (HMD), according to some embodiments.

FIG. 2 illustrates an example of electronic components of HMD 102. In some embodiments, HMD 102 comprises a projection system that includes projector 204 configured to display image frames, including stereoscopic right and left images, on right and left displays 203R and 203L that are viewed by a user right and left eyes 101R and 101L, respectively. Such a projection system may include, for example, a Digital Light Processing (DLP), a Liquid Crystal Display (LCD), or the like. To create a three-dimensional (3D) effect in a 3D virtual view, virtual objects (VOs) may be rendered at different depths or distances in the two images.

HMD 102 includes processor 205 configured to generate frames that are displayed by projector 204. Hardware memory 207 is configured to store program instructions executable by processor 205, as well as other data. In other embodiments, however one or more operations described for processor 205 may be implemented by a different processor within IHS 103.

Accordingly, in some embodiments, HMD 102 may also include control interface 208 and video interface 209 (e.g., a Bluetooth technology interface, USB interface, etc.) configured to communicate with IHS 103. Control interface 208 may provide forward and backward communication channels between HMD 102 and IHS 103, depending upon the architecture of the xR system, to facilitate execution of an xR application. For example, program instructions stored in memory 207, when executed by processor 205, may cause frames captured by camera(s) 108 to be transmitted to IHS 103 via control interface 208.

IHS 103 may in turn execute SLAM module 403 (FIG. 4), for example, based upon landmarks found in the video frames received from camera 108. Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to projector 204 via video interface 209 (e.g., High-Definition Multimedia Interface or "HDMI," Digital Visual Interface or "DVI," DISPLAYPORT, etc.). In some cases, video interface 209 may include two separate video interfaces, one for each display 203R/L. Additionally, or alternatively, a single interface that supports multi-stream may be used to drive both displays 203R/L.

In some embodiments, HMD 102 may include one or more sensors 206 that collect information about the user's environment (e.g., video, depth, lighting, motion, etc.) and provide that information to processor 205. Sensors 206 may include, but are not limited to, inside-out cameras, outside-in cameras, eye tracking cameras, RGB cameras, gesture cameras, infrared (IR) or near-IR (NIR) cameras, SLAM cameras, etc. Additionally, or alternatively, sensors 206 may include electric, magnetic, radio, optical, infrared, thermal, force, pressure, acoustic, ultrasonic, proximity, position, deformation, movement, velocity, rotation, gyroscopic, and/or acceleration sensor(s). In some cases, sensors 206 may be coupled to processor 205 via a sensor hub.

HMD 102 may be configured to render and display frames to provide an xR view for user 101 according to inputs from sensors 206. For example, an xR view may include renderings of the user's real-world environment based on video captured by camera 108. The xR view may also include virtual objects composited with the projected view of the user's real environment.

Still referring to FIG. 2, right and left Near Infra-Red (NIR) light sources 201R and 201L (e.g., NIR LEDs) may be positioned in HMD 102 to illuminate the user's eyes 101R and 101L, respectively. Mirrors 201R and 201L (e.g., "hot mirrors") may be positioned to direct NIR light reflected from eyes 101R and 101L into EGT cameras 202R and 202L located on each side of the user's face. In other implementations, instead of EGT cameras 202R and 202L, a single EGT camera, or a combination of a wide-angle camera with and a narrower-angle camera, may be used.

EGT information captured by cameras 202R and 202L may be provided to processor 205 to be further processed and/or analyzed. For example, processor 205 may adjust the rendering of images to be projected, and/or it may adjust the projection of the images by the projector 204 based on the direction and angle at which eyes 101R/L are looking. Additionally, or alternatively, processor 205 may estimate the point of gaze on right and left displays 203R and 203L to enable gaze-based interaction with xR content shown on those displays.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
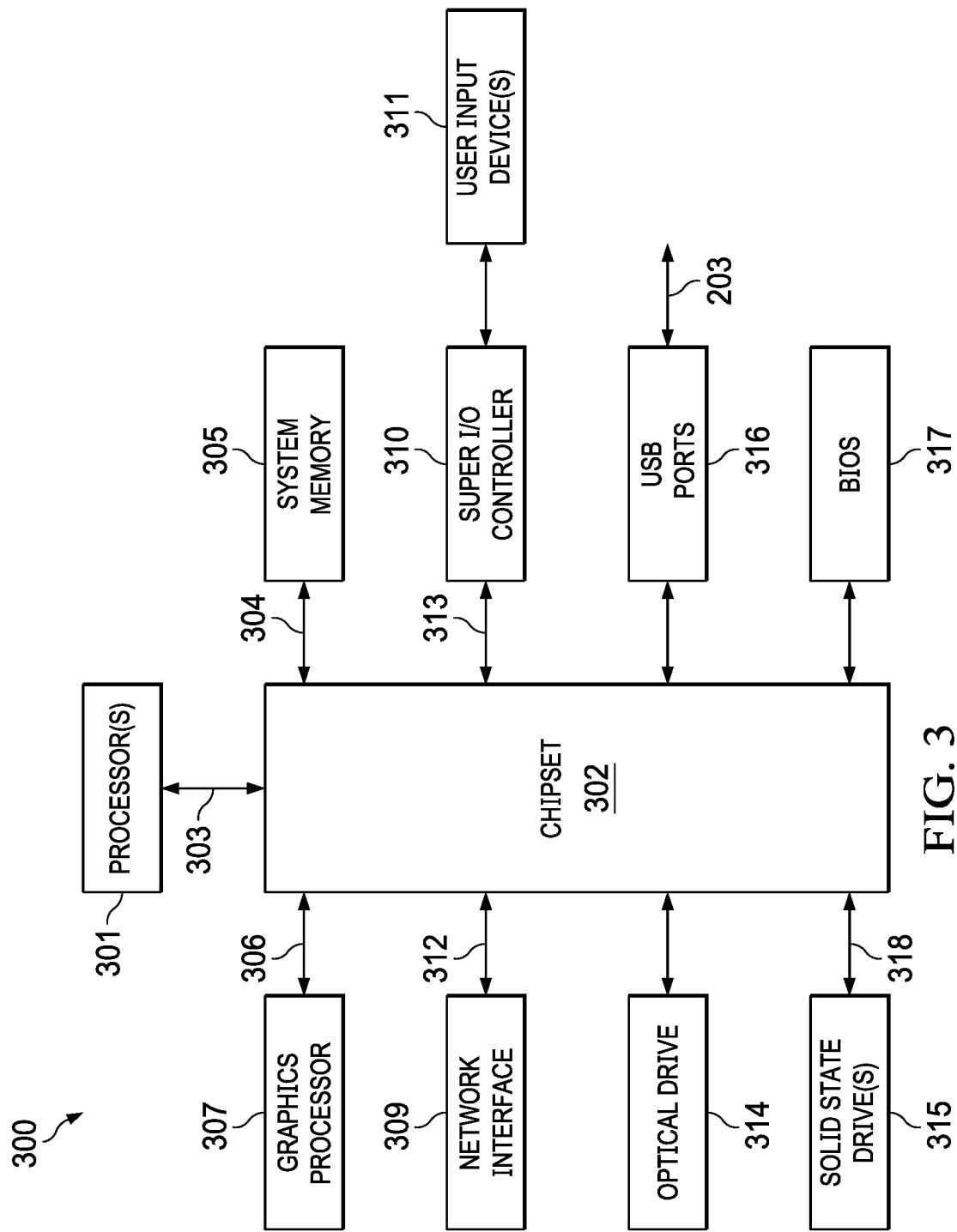
FIG. 3 illustrates an example of electronic components of an Information Handling System (IHS), according to some embodiments.

FIG. 3 is a block diagram of IHS 300 configured to implement host IHS 103, according to certain embodiments.

As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 300 through the chipset 302. In certain embodiments, chipset 302 may be coupled to a network interface 309, such as provided by a Network Interface Controller (NIC) that is coupled to IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communicate with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to IHS 300, or may be located remotely from IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to IHS 300 and to load an operating system for use by IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
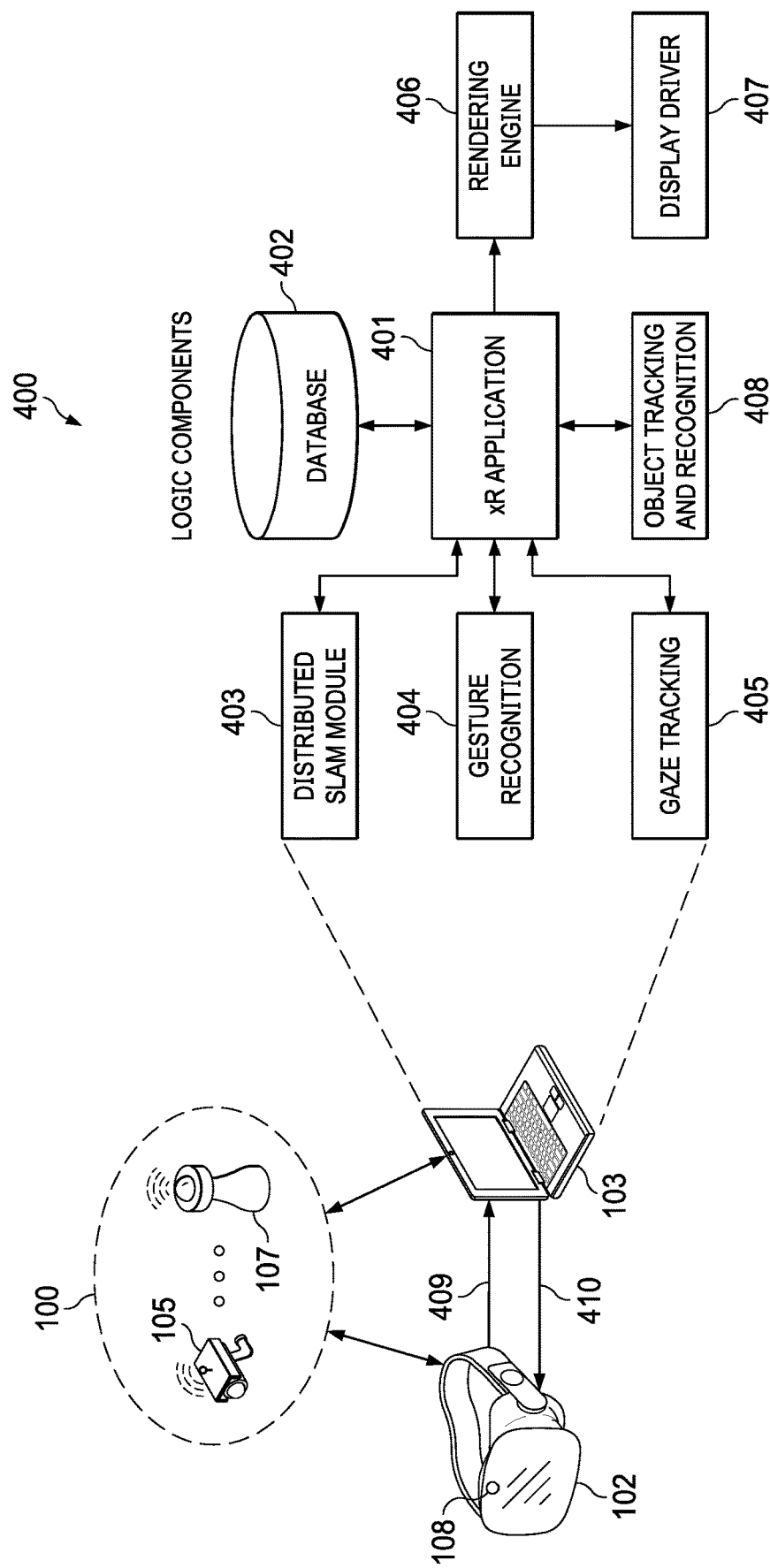
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc.

Distributed SLAM module 403 uses positional tracking devices among camera(s) and sensor(s) 202 (e.g., in the IR spectrum) to construct a map of an unknown environment where an HMD is located, which simultaneously identifies where the HMD is located, its orientation, and/or pose.

Generally, distributed SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100A and/or one or more peripheral devices 106 (e.g., controllers, joysticks, etc.) or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and received sound waves.

Optical tracking may include any suitable computer vision algorithm and tracking device, such as a camera of visible (RGB), IR, or NIR range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers may be placed on HMD 102 or held by user 101. In other cases, markerless inside-out tracking may use continuous searches and feature extraction techniques from video frames obtained by camera 108 (e.g., using visual odometry) to find natural visual landmarks (e.g., window 109) in environment 100A.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel in the ROI, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

In some cases, the consumption of IHS 103's hardware resources (e.g., CPU, GPU, memory, etc.) during operation of a SLAM method may be dependent upon the order or dimension of a square covariance matrix of landmark data (or other features extracted from sensor data). Particularly, IHS hardware resource utilization may be dominated by $O(M^2)$, where M is the number of landmarks detected: if M* is smaller than M, then host hardware utilization is reduced by $(M^2-M^{*2})/M^2 \times 100\%$. For example, if there are 100 landmarks detected (M=100), but only 50 landmarks are used (M=50), the reduction in utilization may be of 75%.

In various embodiments, distributed SLAM module 403 may be configured to sort or rank detected landmarks by confidence, probability, or priority; generate a cutoff based upon a desired or expected amount of resource utilization reduction (e.g., compute load) using calibration data; and employ only a selected subset of all available landmarks (e.g., the M* highest-ranked of M landmarks to be used; M*<M) to generate covariance matrices to be used by the SLAM method thereafter.

In some embodiments, calibration of number of landmarks versus average CPU load (or any other IHS hardware resource) may be performed for the space where the user is engaging in an xR experience, and a calibration curve may be stored in database 402. The calibration curve provides a baseline for the space and the HMD-Host combination; but it should be noted that the process is specific to an HMD, the host IHS being used, and their environment. Calibration may also be used to select an optimal number M of sorted landmarks to use in steady state as the maximum number of landmarks to compute (e.g., a user may set the maximum permitted CPU load for SLAM at 10%, which limits the number of landmarks to 50).

Distributed SLAM module 403 may receive and rank all landmarks detected by HMD 102A (and other HMDs 102B-C and/or their respective IHSs), for example, using EKF. Particularly, EKF may be used to estimate the current state of a system based on a previous state, current observations, and estimated noise or error. A state is defined as a 1×N vector, where N is the number of measurements in a state. The primary relationship for an EKF defines a state transition as:

$$(\text{New State}) = (\text{Old State}) + G((\text{Current Observation}) - (\text{Old State}))$$

where G is known as the Kalman Gain. The value of G is based on average noise and/or measurement error over time, and it determines how much the current observation can be trusted.

The system state in an EKF for SLAM may be a 1×(6+3N) vector, where N is the number of landmarks. In that case, there may be 3 coordinates (e.g., x, y, z) for each landmark, and 6 coordinates (e.g., x, y, z, pitch, roll, yaw) for the user. Landmarks may be any static points in space that can be re-observed at a later state to determine how the system changed (a good landmark is easily identifiable and does not move, such as a wall, window, power outlet, etc.).

In various implementations, a matrix or table of size $(6+3N)^2$ stores the covariance between every pair of state measurements, and may be used when determining the Kalman Gain for a given landmark. The Kalman Gain may be used to determine how much to change every other state measurement based on the re-observed location of a single landmark: a greater Kalman Gain means that the landmark's new position may be trusted and used to update the system's state. Conversely, a Kalman Gain of zero means the position cannot be at all trusted and therefore the landmark should be ignored.

The use of EKF by distributed SLAM module 403 may be divided into 3 parts. The first part updates the current state from user movement. Motion may be described by the IMU data on the HMD, and the user's position and every known landmark's position may be estimated and updated. The second part uses re-observed landmarks via laser scanner or object recognition to update current state (both user position and landmark positions) more accurately than using IMU data, calculates G for the re-observed landmark, and updates the system accordingly. As noted above, G may be a vector showing how much to update every state variable based on the landmark's new position. The third part adds newly-observed landmarks to the system's state. Adding new landmarks adds to the dimensionality of the system state and covariance matrix, such that the algorithm runs on the order of $O(N^2)$, where N is the number of used landmarks.

To rank the landmarks, distributed SLAM module 403 may create a list of landmarks indices, sort the landmark indices by the Kalman Gain of corresponding landmarks, and produce a ranked or sorted list of all detected landmarks. Distributed SLAM module 403 may select a subset of landmarks, and IHS 103 produces an xR environment displayed by HMD 102 based on SLAM processing using only the selected subset of landmarks.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use NIR illumination to estimate the gaze direction or the point of gaze using polynomial functions, or a geometrical model of the human eye.

Gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, gaze tracking module 405 may be configured to follow the user's gaze direction for natural exploration of a visual scene by capturing the user's visual perspective. In some cases, pupil motion may be tracked to estimate a user's viewing point, with Kalman filtering to minimize pupil jitter and drifts. Moreover, gaze tracking module 405 may be used to calculate or adjust the user's field-of-view (FOV).

Rendering engine 406 may include any engine (e.g., UNITY, UNREAL, AUTODESK, etc.) configured to render an xR model displayed by HMD 102 from user 101's unique point-of-view based upon the user's coordinate location (e.g., from distributed SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with distributed SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

In various embodiments, communication methods described herein may take the form of server-client streaming with different transport layer mechanisms, such as Real-time Transport Protocol (RTP) over User Datagram Protocol (UDP)/Transmission Control Protocol (TCP), or the like. In some implementations, a service may be provided on IHS 103A to: run SLAM on configured ROIs for two or more HMDs 102A-C; receive ROI frames; and calculate landmark information. The service may also: receive absolute pose information related to the other HMDs, from their respective other IHSs; resolve absolute pose coordinates using camera transform matrix on landmarks received; construct a list of landmarks "observed" by all HMDs; and feed the list into the SLAM Application Programming Interface (API) of rendering engine 406.

As such, distributed SLAM module 403 of IHS 103A may not only receive and process SLAM data from that IHS's own HMD 102A, but it may also receive SLAM data from other HMDs 102B/C and/or their respective IHSs, of which one or more may be part of an edge cloud architecture. Rendering engine 406 of IHS 103A may render an updated world space camera view for HMD 102A that is built using ROIs/landmarks found by two or more HMD's IR/NIR camera(s) and/or sensors.

In some embodiments, a method may enable any given one of IHSs 103A-C to construct a map for entire space 100A using its own partial map obtained through HMD 102A, and also from HMD 102B and/or 102C and/or their respective IHSs. During an initial setup procedure, ROIs and capabilities may be established through mesh negotiation or other communications among HMDs. In some cases, the size and position of each HMD's ROI—as a selected subset of pixels in a given frame—may be computed using conventional image processing methods. Each particular HMD 102A-C covers a respective one or more ROIs 111A-C, regardless of FOV (even assuming 360-degree SLAM). Each IHS may receive ROI landmark information obtained through other HMDs from their respective IHSs through IHS-to-IHS communications.

The current IHS (e.g., IHS 103A) may, on a per-HMD basis, resolve overlapping landmarks across ROIs that have intersections 112, including occlusion, etc. For example, if a first HMD detects a landmark that is naturally occluded by another object, from the perspective of a second HMD, the occluded landmark may nonetheless be used to render a map for the second HMD, once SLAM data related to the occluded landmark is obtained from the first HMD and transformed into the second HMD's coordinate system. The current IHS may, on a per-HMD basis, apply a corresponding transform matrix to transform landmarks from one ROI Point-of-View (POV) to the current HMD POV based on each HMD absolute and/or the current HMD's pose. Landmarks from HMDs 102B/C may be rotated, moved up/down, etc. when moved from one user's view to match the view of HMD 102A.

Once overlapping landmarks are resolved, they may be corrected for resolved pose, with observed EKFs and relative distances from each user. This data is available to the current IHS for every HMD with which the IHS is in direct communications. The current IHS communicates an HMD map to each HMD via an instance of render engine 406 for that HMD (e.g., IHS 103 may be running multiple render engines, or a single render engine with multi-views).

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

During execution of xR application 401, HMD 102 transmits SLAM sensor data, EGT sensor data, GRT data, WFC data, audio data, inter-process (IPC) communication data, etc. to IHS 103 via back-channel 409. Meanwhile IHS 103 transmits encoded packetized rendered content (e.g., audio-video) to HMD 102 via forward-channel 410. As part of this process, distributed SLAM module 403 may perform one or more SLAM operations based on the SLAM data. In various embodiments, back-channel 409 and/or forward-channel 410 may be established via any of edge cloud architecture channels with local IHS 103, edge server 113, and/or cloud server 114.

Distributed SLAM module 403 operates upon SLAM data to produce a map of the physical location where the HMD is, using a detected number of landmarks in a given ROI (e.g., the HMD's FOV+/−a delta). In some cases, landmarks may be identified using IR markers disposed in the physical space. Additionally, or alternatively, landmarks in an HMD's ROI may be identified via object recognition operations, for example, with markerless machine learning, using images obtained via a world-facing camera.

In some embodiments, distributed SLAM module 403 may include pairing instructions that, upon execution, initiate a pairing process between HMD 102 and peripheral device 106 with a pairing code (e.g., an alphanumeric string or the like) via IR emitters, and establishes a communication handshake over a Radio Frequency (RF) communication channel between HMD 102 and peripheral device 106 using that pairing code, or an indication thereof.

In addition, distributed SLAM module 403 may detect which hand peripheral 106 belongs to, based on which half (right/left) of the SLAM frame it falls into (e.g., after user 101 is instructed to hold peripheral 106 with their arms in front of them).

In a first embodiment, pairing may be initiated by IR emitters mounted on HMD 102 after peripheral device 106 is detected in the SLAM feed. During this time, the number of peripherals—and which hand each peripheral belongs to—may be determined as well. Once peripheral device 106 receives a pairing code from HMD 102, it backchannels with HMD 102 or IHS 103 via another communication channel (e.g., Bluetooth, WiFi, etc.), and shares back the pairing code. If the activation code is accepted by HMD 102 or IHS 103, the handshake process is complete and HMD 102 and peripheral device 106 become paired.

In a second embodiment, pairing may be initiated by peripheral device 106 via an IR mounted thereon, and IHS 103 may detect a pairing code transmitted by peripheral device 106, for example, upon activation of a pairing button. During this time, the number of peripherals—and which hand each peripheral belongs to—may be established. HMD 102 or IHS 103 backchannels to the peripheral via another communication channel (e.g., Bluetooth, WiFi, etc.), and shares back the pairing code. If the activation code is accepted by peripheral device 106, the handshake process is complete and HMD 102 and peripheral device 106 are now paired.

In various implementations, SLAM frame areas usable to identify which peripheral device belongs to which hand may be dynamically and/or unequally split into different sizes, for example, depending upon a direction of the user's gaze and/or head tilt. These areas may be rendered in real-time via the HMD 102's or IHS 103's displays during the pairing process.

Figure 5:
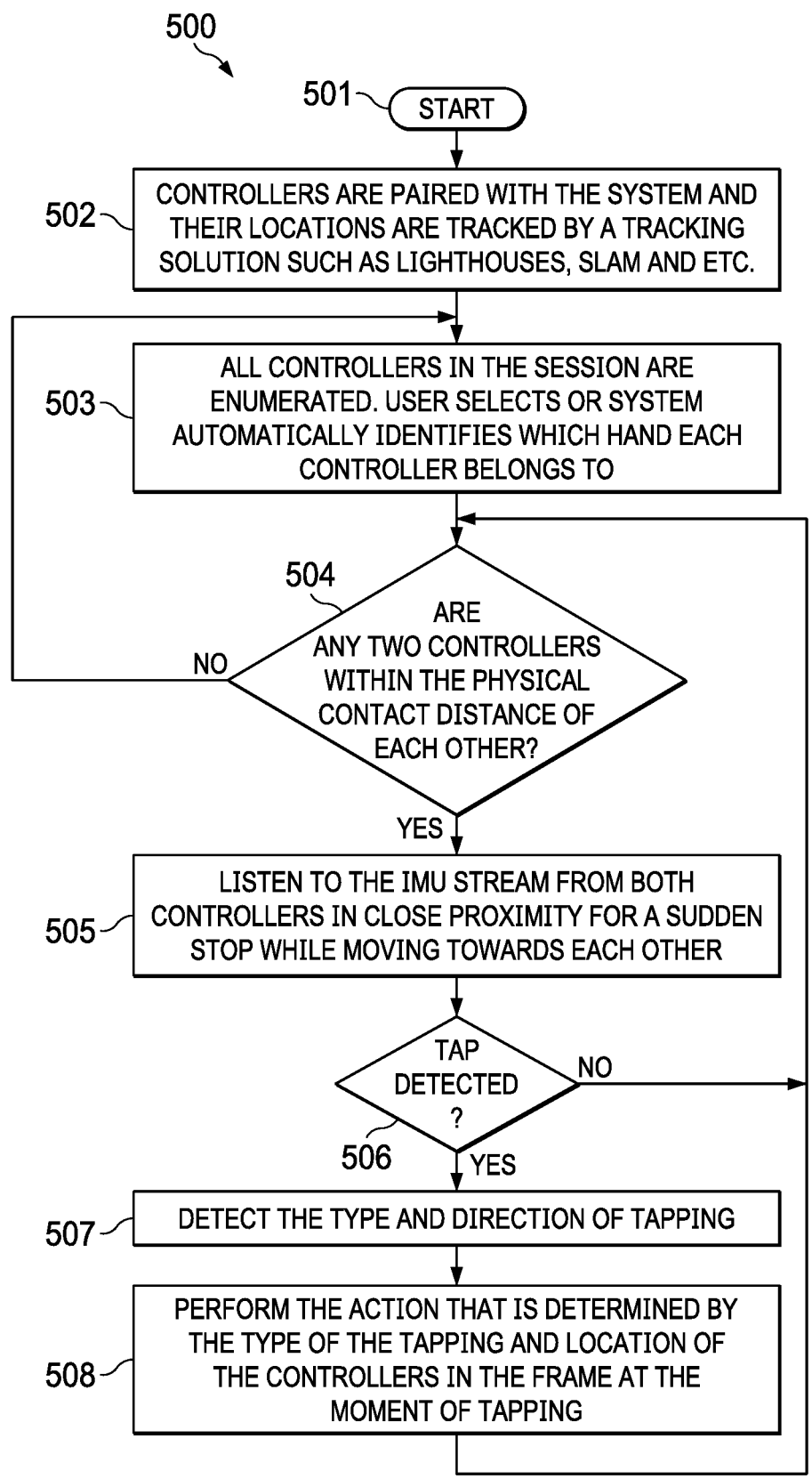
FIG. 5 illustrates an example of a method for providing controller gestures, according to some embodiments.

FIG. 5 illustrates an example of method 500 for providing controller gestures. In some embodiments, method 500 may be performed by xR application 401 in cooperation with distributed SLAM module 403 and/or gesture recognition module 404, under execution by IHS 103 coupled to HMD 102.

Method 500 begins at block 501. At block 502, controller(s) 106 are paired with HMD 102 and/or IHS 103, and their locations in space are tracked by a tracking system, such as lighthouses, SLAM landmarks, etc. At block 503, all controllers 106 in the session are enumerated. The user may select, or the system may autonomously identify, where each controller belongs to (i.e., which hand of each user).

A non-limiting example of a controller enumeration and tracking table (Table I) is shown below:

TABLE I

| Controller ID | User | Hand | Location |
| --- | --- | --- | --- |
| 106AR | A | R | $X_{AR}, Y_{AR}, Z_{AR}$ |
| 106AL | A | L | $X_{AL}, Y_{AL}, Z_{AL}$ |
| 106BR | B | R | $X_{BR}, Y_{BR}, Z_{BR}$ |
| 106BL | B | L | $X_{BL}, Y_{BL}, Z_{BL}$ |
| ... | ... | ... | ... |
| 106NR | N | R | $X_{NR}, Y_{NR}, Z_{NR}$ |
| 106NL | N | L | $X_{NL}, Y_{NL}, Z_{NL}$ |

At block 504, method 500 determines, using the controllers' positions, whether any two or more controllers are within physical contact of each other using a selected threshold distance (e.g., in inches). In response to the threshold distance being met, block 505 listens to IMU stream(s) from the two or more controllers in close proximity of each other for a velocity or acceleration impulse having a minimum magnitude threshold. Such impulse may be detected, for example, when controllers come to a sudden stop after moving towards each other, even in the absence of a physical collision between them, as in a "simulated" tap.

Block 506 identifies, in response to the magnitude threshold being met, that a "tap" has been detected. Block 507 detects the type (e.g., fast or slow) and the 3D direction of tapping (e.g., vertical or horizontal orientation with respect to ground, moving towards each other or away from each other, etc.). In various implementations, a controller's orientation relative to the ground and/or to each other may be identified via SLAM data, IMU feed, and/or any combination thereof.

For example, in some cases both controllers may be in a horizontal orientation with respect to the ground, resulting in the detection of a first gesture. In other cases, both controllers may be in a vertical orientation with respect to the ground (e.g., FIG. 7C), resulting in the detection of a second gesture. In yet other cases, a first one of the controllers may be in a horizontal orientation and the second one may be in a vertical orientation with respect to the ground, resulting in the detection of a third gesture. In still other cases, the first one of the controllers may be in a vertical orientation and the second one may be in a horizontal orientation with respect to the ground, resulting in the detection of a fourth gesture.

In some cases, both controllers may be moving toward each other, resulting in the detection of a first gesture. In other cases, each controller may be moving away from the other one, resulting in the detection of a second gesture. In yet other cases, a first controller may be moving towards the second controller and the second controller may be static, resulting in the detection of a third gesture. In still other cases, the second controller may be moving towards the first controller and the first controller may be static, resulting in the detection of a fourth gesture.

Then, at block 508, method 500 performs an action (e.g., executes a command) associated with the detected controller gesture, which may be determined, for example, by the type of tapping, relative movement between controllers, orientation with respect to the ground, and/or the location of the controllers 106 in a frame (e.g., a SLAM frame) at the moment of tapping.

Figure 6:
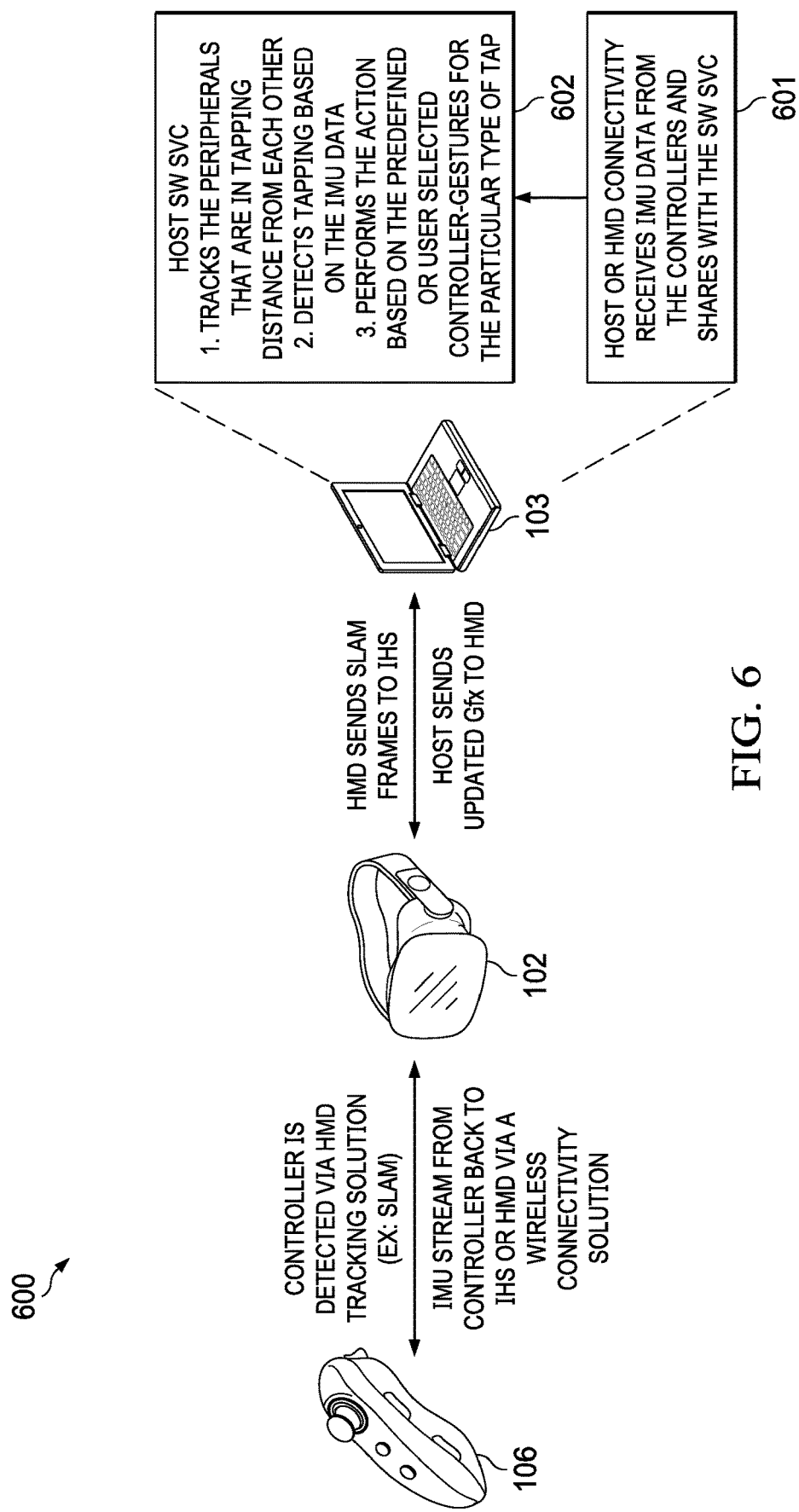
FIG. 6 illustrates an example of a system for enabling controller gestures, according to some embodiments.

FIG. 6 illustrates an example of system 600 for enabling controller gestures. In this embodiment, HMD 102 sends SLAM frames to IHS 103, and IHS sends updated graphics to HMD 102 for display. Moreover, HMD 102 detects controller 106 via a SLAM subsystem, or the like. HMD 102 also receives an IMU data stream with gyroscope and/or accelerometer data via a wireless communication channel (e.g., Bluetooth).

At block 601, HMD 102 receives IMU data from controller 106 and shares it with a service, such as gesture recognition 404 and/or xR application 401. Then, at block 602, the service may: (1) track the controllers and/or other peripheral devices that are in tapping distance from each other, (2) detect tapping based on the IMU data, and (3) perform an associated action based on pre-defined or user-selected controller gestures for a particular type or detected tap.

Figure 7A:
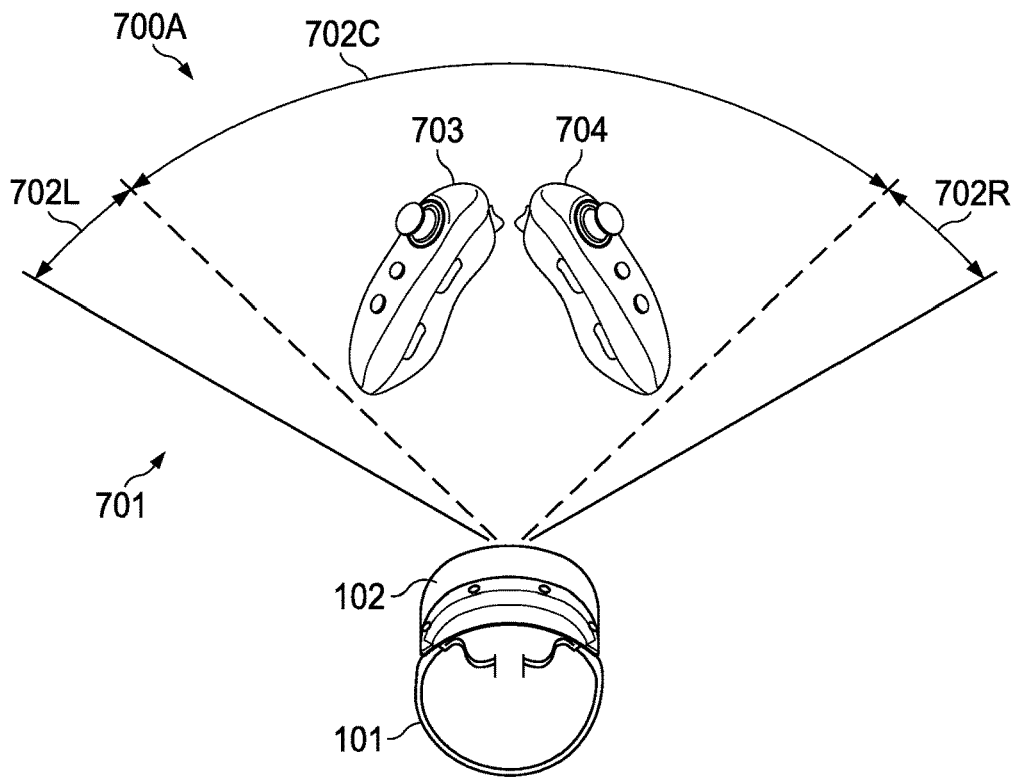
FIGS. 7A-C illustrate an example of a controller gesture, according to some embodiments.
Figure 7B:
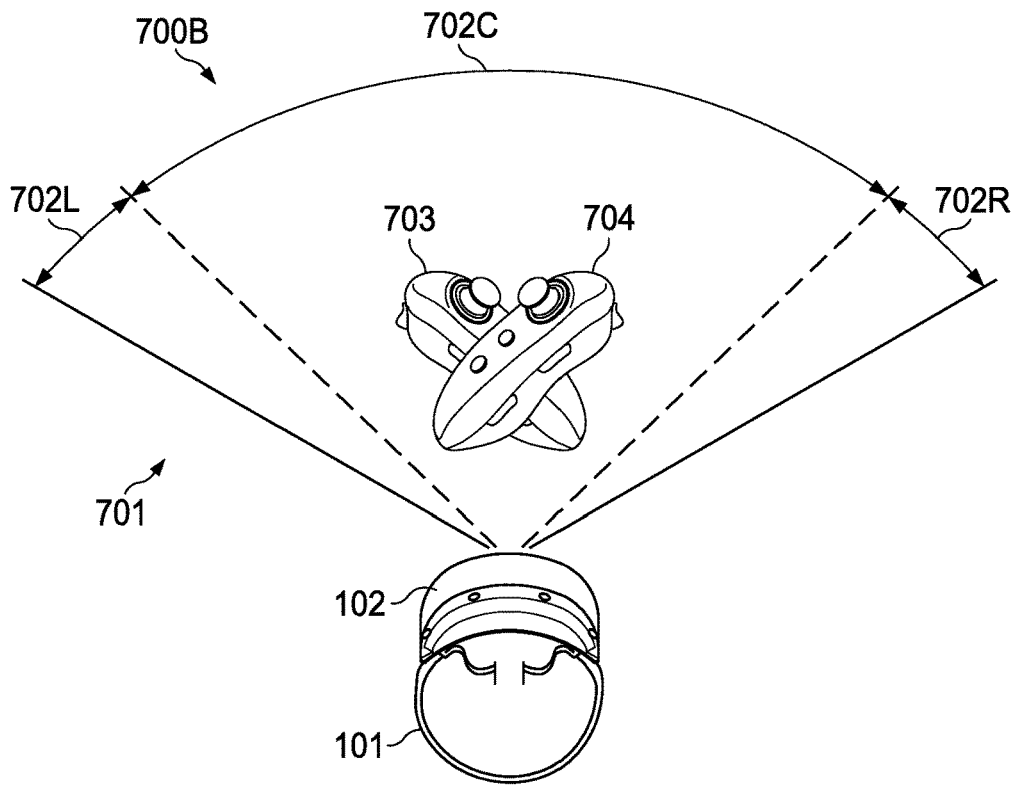
Figure 7C:
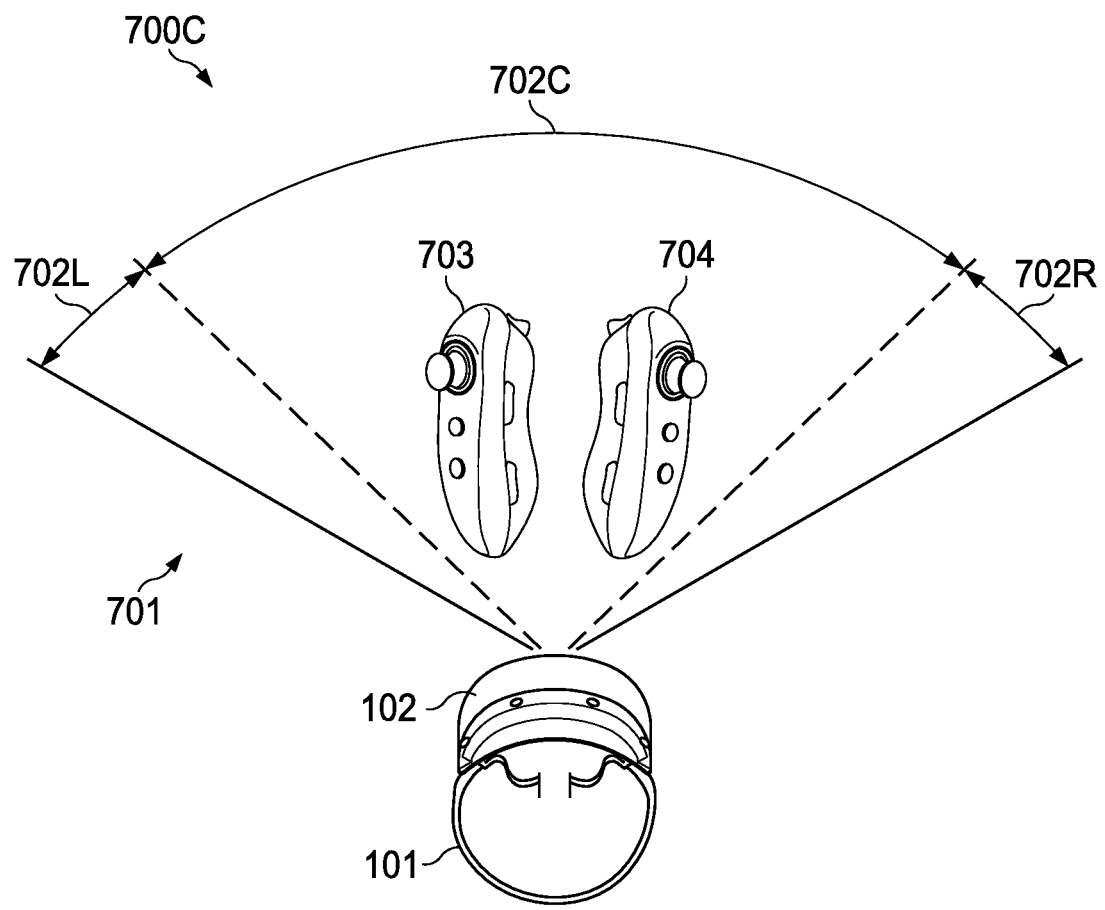

FIGS. 7A-C illustrate an example of a controller gesture 700A-C. In this embodiment, the user's FOV (and/or the SLAM frame) 701 is logically divided into three distinct zones: left side 702L, center area 702C, and right side 702R. In this implementation, every stage of controller gesture 701-A-C takes place in center area 703C, because controllers 703 and 704 are located by the user's HMD 102 in center area 702C.

But in other cases, one or more of controllers 703 and 704 may be in a different zone of FOV 701. Depending upon in which zone a given controller performs its tapping action, a different corresponding command may be triggered. Moreover, in some cases, controller 703 may be held by a first user, and controller 704 may be held by a second user. Depending upon whether controllers 703 and 704 are held by the same user or by a different user, a different corresponding command may be triggered (e.g., switch artifacts, get a user in and out of an going session, etc.). These different commands may be stored in a Look-Up Table (LUT), database, or the like.

At stage 700B, controllers 703 and/or 704 come to a sudden stop, with or without actual physical contact between them, as handled by user 101. Then, at stage 700C, controllers 703 and 704 are spread apart, in this case, in a vertical orientation with respect to the ground. At the moment tapping is detected in sequence 700B, a corresponding command is executed by IHS 103 and/or HMD 102. Although in this example a tapping gesture is being used, in other cases other controller gestures may be detected, such as, for example, pinching to zoom in and out, skipping media forward or backward, etc.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

As previously noted, certain implementations of the systems and methods described herein may not require an HMD. In those cases, a system may include a processing unit (to perform SLAM), a camera coupled to the processor (e.g., looking into the room towards the users), and a display also coupled to the processor (e.g., showing an image of the controllers). These components may be packaged together, for example, as a notebook; or may be separately combined, for example, as a gaming console setup. As such, various component permutations may provide a wide range of devices and systems configured to implement the techniques described herein.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive first Simultaneous Localization and Mapping (SLAM) landmarks corresponding to a first controller;
receive second SLAM landmarks corresponding to a second controller;
determine whether the second controller belongs to a first user or to a second user based upon an evaluation of the Kalman Gain of the second SLAM landmarks;
determine, using the first and second SLAM landmarks, that the first controller is within a threshold distance of the second controller;
in response to the determination, receive first Inertial Measurement Unit (IMU) data from the first controller and second IMU data from the second controller;
identify, using the first and second IMU data, a gesture performed with the first and second controllers; and
execute a command associated with the gesture.

2. The IHS of claim 1, wherein the first and second SLAM landmarks are received from a Head-Mounted Device (HMD) worn by a user.

3. The IHS of claim 1, wherein the first SLAM landmarks are received from a first Head-Mounted Device (HMD) worn by a first user and wherein the second SLAM landmarks are received from a second HMD worn by a second user.

4. The IHS of claim 1, wherein the first and second IMU data comprise accelerometer data indicative of an impulse or collision.

5. The IHS of claim 1, wherein the gesture comprises a tapping gesture.

6. The IHS of claim 5, wherein the tapping gesture is detected in the absence of a physical collision between the first and second controllers.

7. The IHS of claim 5, wherein the program instructions, upon execution, further cause the IHS to identify the tapping gesture as a vertical tap or a horizontal tap.

8. The IHS of claim 1, wherein in response to the gesture being detected in a left side of a SLAM frame, the command is a first command, wherein in response to the gesture being detected in a center area of the SLAM frame, the command is a second command, or wherein in response to the gesture being detected in a right side of a SLAM frame, the command is a third command.

9. The IHS of claim 1, wherein the command comprises switching tools between the first and second controllers in a game.

10. The IHS of claim 1, wherein the command comprises switching tools or characters in a game between a first user operating the first controller and a second user operating the second controller.

11. The IHS of claim 1, wherein the command comprises a pause command or a resume command directed to a game or application executed by the IHS.

12. The IHS of claim 1, wherein the program instructions, upon execution, further cause the IHS to determine whether a peripheral belongs to the user's left hand or right hand.

13. The IHS of claim 12, wherein to determine whether the peripheral device belongs to the user's left hand or right hand, the program instructions, upon execution, further cause the IHS to:
split a Field-of-View (FOV) of a Head-Mounted Device (HMD) into a left side and a right side; and
at least one of:
in response to one or more SLAM landmarks being located on the left side, assign the peripheral device to the user's left hand; or
in response to one or more SLAM landmarks being located on the right side, assign the peripheral device to the user's right hand.

14. A hardware memory device having program instructions stored thereon that, upon execution by a processor of an Information Handling System (IHS), cause the IHS to:
receive, from a first Head-Mounted Device (HMD) worn by a first user, one or more first Simultaneous Localization and Mapping (SLAM) landmarks corresponding to a first controller;
receive, from a second Head-Mounted Device (HMD) worn by a second user one or more second SLAM landmarks corresponding to a second controller;
determine, using the first and second SLAM landmarks, that the first controller is within a threshold distance of the second controller;
in response to the determination, receive first Inertial Measurement Unit (IMU) data from the first controller and second IMU data from the second controller, wherein the first IMU data comprise accelerometer data produced by a third HMD worn by a third user, and wherein the first and third HMDs are in communication with each other;
identify, using the first and second IMU data, a gesture performed with the first and second controllers; and
execute a command associated with the gesture.

15. A method, comprising:
receiving, at an Information Handling System (IHS), first Simultaneous Localization and Mapping (SLAM) landmarks corresponding to a first controller, wherein the first SLAM landmarks comprise location data indicative of a position of the first controller;
receiving, at the IHS, second SLAM landmarks corresponding to a second controller, wherein the second SLAM landmarks comprise location data indicative of a position of the second controller;
identifying, by the IHS using: (i) the first SLAM landmarks, (ii) the second SLAM landmarks, (iii) first Inertial Measurement Unit (IMU) data, and (iv) second IMU data, a gesture performed with the first and second controllers, wherein the first and second IMU data comprise accelerometer data indicative of a simulated tap between the first and second controllers; and
executing, by the IHS, a command associated with the gesture.

16. The method of claim 15, wherein the first SLAM landmarks are received from a first Head-Mounted Device (HMD) worn by a first user and wherein the second SLAM landmarks are received from a second HMD worn by a second user.

* * * * *